Patented June 19, 1923.

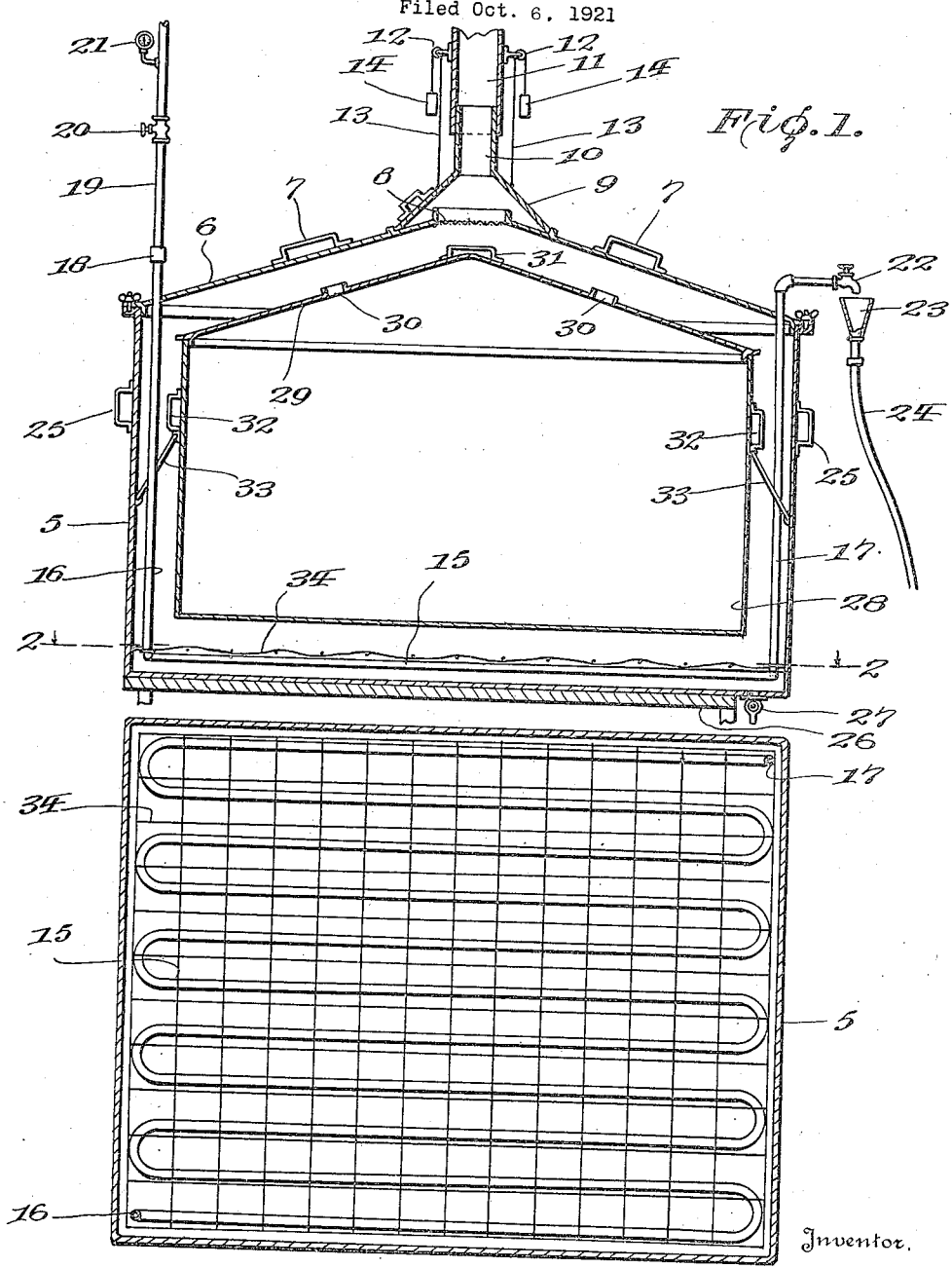

1,459,466

UNITED STATES PATENT OFFICE.

THOMAS A. HODGE, OF FRANKLIN, INDIANA.

COOKER.

Application filed October 6, 1921. Serial No. 505,965.

*To all whom it may concern:*

Be it known that I, THOMAS A. HODGE, a citizen of the United States, residing at Franklin, in the county of Johnson and State of Indiana, have invented new and useful Improvements in Cookers, of which the following is a specification.

This invention relates to apparatus for cooking food articles, and more particularly a steam cooking apparatus.

The invention has for its object to provide a novel and improved apparatus of the kind stated capable of being used in different ways as will be described in detail hereinafter.

In order that the invention may be better understood, reference is had to the accompanying drawing forming a part of this specification, and in said drawing:

Figure 1 is a central vertical section of the apparatus, and

Fig. 2 is a horizontal section on the line 2—2 of Fig. 1.

In carrying out the invention, I provide an outer vessel 5 which is open at the top and here fitted with a removable lid or other closure 6 having handles 7 to facilitate removal and replacement. The center of the lid 6 is also provided with a screened steam and vapor outlet over which removably seats the lower flared end 9 of a pipe 10 which extends at its upper end into a vapor escape flue 11. The pipe 10 is slidable upwardly into the flue 11 to take its lower end 9 clear of the lid 6, and thus permit removal of the latter from the vessel 5. On the outside of the flue 11 are guide pulleys 12 over which are trained lines 13 connected at one end to the flared lower end 9 of pipe 10, and fitted with counterweights 14 at their other ends. This arrangement facilitates the raising of the pipe 10 when the lid 6 is to be removed for access to the interior of the vessel 5.

In the vessel 5, at the bottom thereof is a coil 15 of piping. One end of the coil 15 is connected to a steam supply pipe 16, and the other end is connected to a steam escape pipe 17, these two pipes extending upwardly through the vessel 5 from the coil, and being located at diagonally opposite corners thereof, and at corresponding points the lid 6 has apertures through which the pipes pass.

Outside the vessel 5, the pipe 16 is connected by a union 18 to a pipe 19 connected to a suitable source of steam supply, and fitted with a valve 20 and a pressure gage 21.

Outside the vessel 5, the pipe 17 is provided with an escape valve 22 arranged to discharge into a funnel 23 to which is connected a flexible hose or other suitable conduit 24 for carrying the waters of condensation to a suitable place of disposal.

The sides of the vessel 5 are provided with handles 25, and when in use said vessel may be placed on a bench or other suitable support 26. In the bottom of the vessel is a valved outlet 27.

In the vessel 5 is removably seated a second vessel 28 which is open at the top and here provided with a removable lid 29 having steam and vapor outlets 30 and a handle 31. The sides of the vessel 28 are also provided with handles 32 which are engageable by props 33 on the sides of the outer vessel 5, whereby said inner vessel is supported in the outer vessel. When in proper position, the vessel 28 is spaced at the bottom from the coil 15, and it is so dimensioned that it is also spaced at the sides and top from the sides and top of the outer vessel.

At 34 is shown a screen seating on top of the coil 15 for a purpose to be presently described.

The manner in which the apparatus is used may be summarized as follows:

The articles to be cooked are placed in the vessel 28 with a suitable quantity of water, and sufficient water is run into the vessel 5 to leave the vessel 28 partly immersed. The water in vessel 5 is heated by the steam coil 15, and this heated water, in turn, heats the contents of the vessel 28. Steam enters the coil 15 upon opening the valve 20, and it is regulated by the valve 22, so that the cooking operation may proceed as fast or as slow as desired. The steam and vapors from the boiling water in the vessel 5 escape through the outlet 8 into pipe 10 and are carried by the latter to the flue 11. After the contents of the vessel 28 have been cooked, the steam may be regulated to keep the water in vessel 5 heated to a degree just sufficient to keep said contents hot, so that they may be left in the vessel 28 and kept hot until ready to serve.

The apparatus may also be used without the inner vessel 28, the articles to be cooked being placed on the screen 34 which prevents them from getting between the convolutions of the coil 15. Water will be placed in the vessel 5 to cover the articles on the screen 34 and this water is heated by the coil 15, and its temperature controlled, as before. When boiling potatoes, the valve 27 may be opened after the cooking operation is completed, to let the water out of the vessel 5 so that the potatoes may be left to dry. When cooking meats or other articles, the juices may be collected by opening the valve 27.

The apparatus is very simple in construction and inexpensive in operation, and by its use any article of food can be properly cooked, and without danger of being burned or scorched. The apparatus is also capable of being used for canning and preserving, and various other operations as will be readily understood by those skilled in the art.

I claim:

1. A cooking apparatus comprising a vessel provided with a removable closure, a steam heating coil in the vessel at the bottom thereof, means for controlling the steam supply of the coil, a second vessel supported in the aforesaid vessel spaced from the walls thereof and above the coil, and a removable closure for said second vessel provided with vapor outlets into the first-mentioned vessel.

2. A cooking apparatus comprising a vessel provided with a removable closure, having a vapor outlet, a steam heating coil in the vessel at the bottom thereof, means for controlling the steam supply of the coil, an escape pipe having its inlet end over the aforesaid vapor outlet, and a support for said pipe for permitting raising thereof to clear the closure having the vapor outlet.

In testimony whereof I affix my signature.

THOMAS A. HODGE.